United States Patent [19]

Chambard et al.

[11] Patent Number: 5,807,429
[45] Date of Patent: Sep. 15, 1998

[54] COMPOUND BINDER, PROCESS FOR OBTAINING IT AND APPLICATION IN HIGHWAY SURFACING

[75] Inventors: René Chambard, Paris; Jacques Gaultier, Chatenay-Malabry; Robert Pellion, Magny les Hameaux; Gérard Perrono, Saint-Cyr-L'Ecole, all of France

[73] Assignee: Colas S.A., Boulogne-Billancourt, France

[21] Appl. No.: 480,866

[22] Filed: Jun. 7, 1995

Related U.S. Application Data

[63] Continuation of Ser. No. 137,752, Oct. 19, 1993, abandoned, which is a continuation of Ser. No. 686,471, Apr. 17, 1991, abandoned.

[30] Foreign Application Priority Data

Apr. 18, 1990 [FR] France ................................. 90 04944

[51] Int. Cl.$^6$ .................................................. C08L 95/00
[52] U.S. Cl. ...................... 106/281.1; 106/668; 106/807; 106/823; 106/DIG. 7
[58] Field of Search ................................ 106/281.1, 640, 106/642, 643, 668, 807, 822, 823, DIG. 7

[56] References Cited

U.S. PATENT DOCUMENTS

| 4,193,816 | 3/1980 | Ferm et al. | 106/277 |
| 4,265,674 | 5/1981 | Debus et al. | 106/314 |

FOREIGN PATENT DOCUMENTS

| 903034 | 2/1986 | Belgium . | |
| 1453419 | 9/1966 | France . | |
| 2330733 | 8/1977 | France . | |
| 7545074 | 8/1977 | France . | |
| 2395233 | 1/1979 | France . | |
| 2606801 | 5/1988 | France . | |
| 49-121825 | 3/1973 | Japan . | |
| 0069651 | 5/1980 | Japan | 106/668 |
| 1148842 | 4/1985 | U.S.S.R. | 106/668 |
| 0707284 | 9/1985 | U.S.S.R. | 106/668 |

OTHER PUBLICATIONS

*Asphalts and Allied Substances*, by Herbert Abraham. vol. 1, pp. 546–549.

Bitumen Emulsions–General Informaton Applications published in 1988 (in French and English Languages) pp. 20–41.

Chemical Abstracts, vol. 82, 1975, p. 235, Abstract No. 159776x, Columbus, Ohio, US: & JP–A–121 825 (K. Suzuki) 21 Nov. 1974.

Chemical Abstracts, vol. 94, No. 6, Feb. 9, 1981 p. 313, Abstract No. 35438s, Columbus, Ohio, US: & JP–A–80 69 651 (Japan National Railways Nichereki Chemical Industry Co., Ltd) 26 May 1980.

Chemical Abstracts, vol. 83, 1975, p. 319, Abstract No. 84064y, Columbus, Ohio, US: JP–A–75 33 218 (Denki Kagaku Kogyo K.K.) 31 Mar. 1975.

*Primary Examiner*—Paul Marcantoni
*Attorney, Agent, or Firm*—Greenblum & Bernstein, P.L.C.

[57] ABSTRACT

Compound binder comprising an aqueous emulsion of at least one hydrocarbon binder and, at least one hydraulic binder, which also contains at least one adjuvant intended to control the rate of setting of the hydraulic binder in order to obtain a liquid product with a viscosity of less than 1 Pa·s.

18 Claims, No Drawings

COMPOUND BINDER, PROCESS FOR OBTAINING IT AND APPLICATION IN HIGHWAY SURFACING

This application is a continuation of application Ser. No. 08/137,752, filed Oct. 19, 1993, now abandoned, which is a continuation of application Ser. No. 07/686,471 filed on Apr. 17, 1991; now abandoned.

BACKGROUND OF THE INVENTION

The present invention relates to a compound binder, to a process for obtaining it and to its application in highway surfacings.

In the present invention a compound binder means a homogeneous product consisting of at least one mineral substance whose hardening is a result of a hydration reaction in the presence of at least one specific adjuvant and of an aqueous emulsion of at least one hydrocarbon substance.

For some applications the compound binder of the invention is filled with mineral, metallic or organic matters.

DISCUSSION OF BACKGROUND INFORMATION

It has been known for a very long time that hydraulic setting binders: cement, mixed lime which are used in combination with soil earthworks make it possible to improve their boyancy and to increase the strength of the fills. For several decades now, the systematic study of the properties of these binders has made it possible to specify the conditions which are required to permit their use in the production of modern highway structures.

The courses which are thus bonded form a material endowed with a high rigidity, independent of temperature and ensuring a good load distribution: the rigidity modulus is at least 15,000 MPa. On the other hand, they exhibit appreciable disadvantages. The material is brittle, because of its high rigidity, resulting in cracks during small movements of the soil, for example; a low relative deformation is observed: from 20 to $60 \times 10^{-6}$. The upper part of the course has a lower strength, and this requires a thick surfacing course if the traffic is average or heavy. Setting or thermal shrinkage fissures are always observed in these courses. Finally, progressive development of structures with these materials is impossible, which prevents the subsequent adaptation of the course to the traffic.

Concurrently with hydraulic sand-gravel mixes, there have been developed over a number of decades techniques based on bitumen emulsions whose most highly developed forms are referred to by the name "emulsion-sand-gravel mix". Materials treated with hydrocarbon binders have advantages under a number of headings. They are capable of deforming under slow stress: relative deformation: 90 to $150 \times 10^{-6}$ at 10° C. In addition, these materials have a good surface strength, which permits thin surface courses. Lastly, they offer the possibility of progressive development of structures in which they are involved. On the other hand, they have the disadvantage of exhibiting a low rigidity: the rigidity modulus at 15° C. lies between 1000 and 5000 MPa and more commonly between 2000 and 3500 MPa.

A person skilled in the art has therefore been obliged to make a choice between two cold techniques, both offering advantages, but also presenting specific disadvantages. In the past it has indeed been envisaged to resort to binders of two kinds, on the one hand hydraulic and on the other hand hydrocarbon, but each of these binders was introduced separately into the mineral framework. Such an application technology was not without risks insofar as the mutual compatibility of these binders was concerned, it being even possible for their action to be perturbed in some cases.

As far as is known hitherto there is no known liquid compound binder containing phases which are completely homogeneous between the aqueous emulsion of hydrocarbon binder and the hydraulic binder.

FR-A-75 45,074 describes a self-curable mass for immediate application, consisting of an emulsion of bitumen in water and of a mixture of cement and of a fluid mineral oil.

FR-A-86 16,023 describes a compound binder consisting of a hydrocarbon product as a dispersed phase and of cement dispersed in water. This product is not wholly satisfactory because it is not homogeneous enough.

There is therefore a need for a homogeneous compound binder capable of being stored and employed subsequently.

The compound binder according to the present invention permits uniform proportioning. It is easy to apply because of its high homogeneity. Its liquid form ensures very easy utilization.

A person skilled in the art knows that it is difficult to mix well products which are quite different in their nature.

SUMMARY OF THE INVENTION

The present invention meets the needs referred to above by permitting the manufacture of a homogeneous compound binder with which treated materials which offer many advantages are obtained. The rigidity contributed by the hydraulic binder ensures good distribution of the fillers: the rigidity modulus varies with temperature. The ability to deform under repeated loading is greater than that of a material treated with hydraulic binders. There is no, or very little, cracking due to setting or to thermal shrinkage. Insofar as the proportioning of the binder in the materials to be treated is concerned, the advantages are of two orders: qualitatively a better distribution of the hydraulic fraction of the binder is obtained, the latter being in the form of an aqueous dispersion, than in the case of introduction in the form of dry powder; quantitatively, measuring a liquid is easier and more reliable than continuous proportioning of a powder by weight.

The emulsion of the invention must be suitably formulated to be compatible with the hydraulic binder. In particular, the hydraulic binder must not flocculate and must not set quickly.

It is also appropriate to choose a suitable surfactant and a suitable ratio of the constituents.

DESCRIPTION OF PREFERRED EMBODIMENT

The subject of the present invention is a compound binder comprising an aqueous emulsion of at least one hydrocarbon binder and, at least one hydraulic binder. Said compound binder also contains at least one adjuvant intended to control the rate of setting of the hydraulic binder in order to obtain a liquid product with a viscosity of less than 1 Pa·s.

In one aspect of the invention, there is provided a homogeneous storable compound binder comprising:

a) about 23 to 74.8 weight percent of an aqueous emulsion of at least one hydrocarbon binder, b) about 24.9 to 76.8 weight percent of at least one hydraulic binder; and c) at least one adjuvant in an amount effective to control rate of setting of the at least one hydraulic binder, in order to obtain a homogeneous storable liquid product capable of maintaining a viscosity of less than 1 Pa·s. The at least one adjuvant can be present from about 0.15 to 0.25 weight percent.

Another object of the present invention is a process for obtaining the compound binder, which consists in:

a) introducing at least one surfactant into water at a temperature of between approximately 10° C. and approximately 80° C.;

b) heating at least one hydrocarbon binder to a temperature of between approximately 100° and 200° C. in a separate container;

c) mixing the surfactant into the hydrocarbon binder so as to obtain an aqueous emulsion;

d) conveying the aqueous emulsion to a homogenizer while introducing a hydraulic binder separately into this homogenizer;

e) introducing an adjuvant at any stage to control the rate of setting of the hydraulic binder;

f) optionally adding one or more fillers before or after the mixing in the homogenizer;

g) storing the final product for its subsequent utilization.

A further object of the present invention is the application of the compound binder in highway surfacings.

Another object of the present invention is the following features:

the adjuvant is chosen from setting-retarders, cure accelerators, thinners, plasticizers, inhibitors, thixotropic agents and organic polymers;

the adjuvant is gluconate;

the compound binder additionally comprises at least one mineral filler;

the compound binder additionally comprises at least one organic filler;

the compound binder additionally comprises at least one metal filler;

the mineral filler consists of siliceous flours, limestone flours, natural fibers, manufactured fibers or any one mixture thereof;

the organic filler consists of vegetable fibers, synthetic fibers, polyamide, polyvinyl chloride, polyesters, polyethylene, polypropylene or any one mixture thereof, the metal filler consists of aluminum powder, iron filing, copper alloys or any one mixture thereof;

the compound binder comprises, per 100 parts of hydraulic binder, from approximately 30 to 300 parts of aqueous emulsion of hydrocarbon binder, from approximately 0.2 to 1 part of adjuvant, from 0 to 1 part of mineral filler and from 0 to 15 parts of metal filler;

the adjuvant is added directly to the aqueous emulsion of hydrocarbon binder;

the adjuvant is added after the mixing of the aqueous emulsion of hydrocarbon binder and of hydraulic binder in the homogenizer;

the hydrocarbon binder is chosen from pure bitumens, regenerated bitumens, paraffinic, naphthenic or aromatic petroleum solvents, petroleum compounds resulting from steam-cracking distillates, pure tars, coal fluxing oils, heavy oils and soft and special pitches;

the hydraulic binder consists of cement or of slag cement containing lime, to which water is added if necessary.

In the hydraulic binder of the invention the ratio added water:cement is within the range of 0 to 50 parts of water per 100 parts of cement.

It is quite obvious that a sufficient quantity of water is added if necessary to have a liquid product.

It is appropriate to make it clear that when the aqueous emulsion is being obtained in the homogenizer the ratio hydrocarbon binder:aqueous phase is from 30:70 to 75:25.

The ratio of hydrocarbon binder to the aqueous phase is generally 60:40.

The temperature of the emulsion may vary in the range from 5° to 70° C. and that of the cement in the range from 5° to 50° C. Obviously everything depends on the climatic conditions of application.

The compound binder of the invention does not cure before an extended period of time, and this permits its storage and its subsequent utilization.

The compound binder of the invention comprises, as a mixture before it is employed:

[1] One or more hydrocarbon substances in the form of aqueous emulsion. These hydrocarbons may originate from the distillation of crude oil and/or may be produced from derivatives of the coal industry.

If hydrocarbons from a petroleum source are involved, the following will be employed:

pure bitumens such as those specified in French Standard T 65-001;

bitumens which are not specified in French Standards and are produced by oil refineries to meet particular criteria and uses: this is the case, for example, of some so-called "regenerated" bitumens obtained by mixing a base from deasphalting using propane, which is softened with a solvent-extracted distillation cut. The main features of these mixtures are that they are poor in asphaltenes and rich in aromatic compounds;

paraffinic, naphthenic or aromatic petroleum solvents;

petroleum compounds resulting from steam-cracking distillates, from the bottom of a column for distilling condensates recovered from natural gas or from other petrochemical treatment processes.

In the case of hydrocarbons of coal origin there may be mentioned:

pure tars such as those specified in French Standard T 65-021;

coal fluxing oils produced from mixtures of primary distillation oils and of fractions corresponding to cuts of specific characteristics; heavy oils called "creosotes" can be included in this series of products;

soft and special pitches resulting from mixing pure tars and coal plasticizing oils;

[2] One or more categories of hydraulic binders; these may be cements such as those defined by French Standard NF P 15-301, and/or other hydraulic binders, for example slag cements containing lime (French Standard NF P 15-306) and natural cements (French Standard NF P 15-308);

[3] At least one adjuvant intended to contribute specific characteristics or properties.

When it is appropriate to modify the hydrocarbon substance(s), it is possible to employ organic polymers which are introduced either in the base hydrocarbon before it is emulsified, or in the aqueous phase of the emulsion, or, again, in the finished emulsion before it is mixed with the hydraulic binder(s).

When modification of the behavior of the hydraulic setting fraction is involved, use will be made of setting-retarders, cure accelerators, thinners, plasticizers, inhibitors and other similar agents.

When it is appropriate to modify the characteristics of the compound binder, one or more agents will be employed which are intended to affect the Theological behavior of the combined components. For example, thixotropic agents will be involved in this specific example.

[4] Mineral fillers (siliceous and/or limestone flours, natural or manufactured fibers such as rock fibers or glass fibers) or organic fibers of the vegetable fiber kind, synthetic fibers such as polyamides, polyvinyl chloride, polyesters, polyethylene or polypropylene and the like.

[5] Metal fillers, examples of which are aluminum powder, iron filing or copper alloys and the like.

In the compound binder of the invention the hydrocarbon emulsion is a direct emulsion (of the lipophilic/hydrophilic type) or optionally a multiple emulsion of the hydrophilic/lipophilic/-hydrophilic type. The use of microemulsions can also be envisaged. Bearing in mind the nature of the surfactants employed for conferring the stability which is required of hydrocarbon substances dispersed in the aqueous phase, the emulsion may be anionic or cationic. However, the choice of the surface agents resorted to is not limited solely to these two categories alone; in fact, it is also possible to employ ampholytic or nonionic surfactants. Among the large number of surface-active substances capable of being employed there will be mentioned, by way of example, quaternary ammonium salts in the case of cationic surface-active agents, potassium salts of proteins of animal or vegetable origin in the case of the ampholytic surfactants and, lastly, polyethoxylated alkylphenols in the case of the nonionic surfactants.

It is quite obvious that the various products discussed above are given by way of examples, no limitation being implied.

The invention is illustrated by the non-limiting examples below, where the quantities which are given in parts are to be understood per 1000 parts of total compound binder.

EXAMPLE 1

219.2 parts of naphthenic bitumen with a penetrability of between 60 and 100 tenths of a mm (measured according to French Standard NF T 66-004) are heated to approximately 140° C. 165.4 parts of a surfactant solution are prepared separately, made up of 4.6 parts of casein which is reacted with 0.8 parts of potassium hydroxide in 159.4 parts of water heated to 40° C. 0.6 parts of 30% formaldehyde are added to this aqueous phase.

The two phases are then dispersed in a homogenizer of the colloid mill type. 384.6 parts of an emulsion containing 57% of bitumen are obtained.

When this emulsion is cooled 175.9 parts of cold water and 438.5 parts of cement are added to it with fast stirring. The liquid compound binder is ready for use.

EXAMPLE 2

To 135.8 parts of a hard base from deasphalting using propane, with a penetrability not exceeding 30 tenths of a mm (measured according to French Standard NF T 66-004), heated to approximately 180° C., are added 81.6 parts of a solvent-extracted aromatic oil with a kinematic viscosity at 50° C. of between 300 and 500 mm$^2$/S (measured according to French Standard NF T 60-100), heated to approximately 80° C. These two starting materials are then mixed and the homogeneous mixture is maintained at approximately 130° C. 144.9 parts of a solution of a surface-active agent are prepared separately, made up of 5.6 parts of polyethoxylated nonylphenol, of 1.4 parts of plasticizer for concrete and of 137.9 parts of water heated to 40° C.

The two phases are then dispersed in a homogenizer of the colloid mill type. 362.3 parts of an emulsion containing 60% of dispersed hydrocarbon phase are obtained.

When this emulsion is cooled 202.9 parts of cold water and 434.8 parts of cement are added to it with fast stirring. The liquid compound binder is ready for use.

EXAMPLE 3

241.3 parts of paraffinic bitumen with a penetrability of between 50 and 70 tenths of a millimeter (measured according to French Standard NF T 66-004) are heated to approximately 150° C. 333.4 parts of a solution of surface-active agent are prepared separately, made up of 9.4 parts of stearylpentamethyldiammonium chloride in solution at a concentration of 50% in a hydro-isopropanolic medium, of 0.6 parts of calcium chloride hexahydrate and of 323.4 parts of water heated to 40° C.

The aqueous phase and the bitumen, to which 10.1 parts of lamp oil of characteristics defined in French Standard NF M 15-003 are added extemporaneously before it is introduced into the colloid mill, are then dispersed by being passed through a homogenizer of the colloid mill type. The homogenous extemporaneous mixture of the bitumen and of the lamp oil is obtained by passing through a static dispersing device. 584.8 parts of an emulsion are thus obtained, containing 43% of dispersed phase consisting of a thinned bitumen containing 4% of lamp oil.

When this emulsion is cooled, 415.2 parts of cement are added to it with rapid stirring. The liquid compound binder is ready for use.

At present, the most satisfactory adjuvant in making use of the present invention has been a yellowish liquid with a relative density of 1.17 at 25° C. and of neutral pH, known under the trade name of Plastiretard, supplied by the company Sika S.A. This product, which is in accordance with French Standards NF P 18-337 and NF P 18-336, is a gluconate.

It is important to note that while the adjuvant can be mixed directly with the emulsion of hydrocarbon binder before it is mixed with the hydraulic binder or consequently after the mixing between the emulsion of hydrocarbon binder and the hydraulic binder, on the other hand the various possible fillers must be introduced after the mixing of the emulsion of the hydrocarbon binder and of the hydraulic binder which has received at least the adjuvant intended to control the rate of setting of the hydraulic binder.

The invention is not limited to the embodiments shown and described in detail, and various modifications can be introduced therein without departing from its scope.

What is claimed is:

1. A homogeneous storable compound binder comprising:
  a) about 23 to 74.8 weight percent of an aqueous emulsion of at least one hydrocarbon binder;
  b) about 24.9 to 76.8 weight percent of at least one hydraulic binder; and
  c) at least one adjuvant in an amount effective to control rate of setting of said at least one hydraulic binder, in order to obtain a homogeneous storable liquid product capable of maintaining a viscosity of less than 1 Pa·s.

2. The compound binder as claimed in claim 1, wherein said at least one adjuvant is selected from the group consisting of setting-retarders, cure accelerators, thinners, plasticizers, inhibitors, thixotropic agents and organic polymers.

3. The compound binder as claimed in claim 1, wherein the at least one adjuvant is a gluconate.

4. The compound binder as claimed in claim 1, which additionally comprises at least one mineral filler.

5. The compound binder as claimed in claim 1, which additionally comprises at least one organic filler.

6. The compound binder as claimed in claim 1, which additionally comprises at least one metal filler.

7. The compound binder as claimed in claim 4, wherein said at least one mineral filler is selected from the group consisting of siliceous flours, limestone flours, natural fibers, manufactured fibers, and mixtures thereof.

8. The compound binder as claimed in claim 5, wherein said at least one organic filler is selected from the group consisting of vegetable fibers, synthetic fibers, polyamide, polyvinyl chloride, polyesters, polyethylene, polypropylene, and mixtures thereof.

9. The compound binder as claimed in claim 6, wherein said at least one metal filler is selected from the group consisting of aluminum powder, iron filings, copper alloys, and mixtures thereof.

10. The compound binder as claimed in claim 1, which comprises, per 100 parts of hydraulic binder, from about 0 to 1 part of mineral filler, and from about 0 to 15 parts of metal filler, and wherein said at least one adjuvant is present from about 0.15 to 0.25 weight percent.

11. The compound binder as claimed in claim 1, wherein said at least one adjuvant is present from about 0.15 to 0.25 weight percent.

12. The compound binder as claimed in claim 1, comprising between about 0 and 15 parts of metal filler.

13. The compound binder as claimed in claim 1, which comprises, per 1000 parts of total compound binder, 384.6 parts of said aqueous emulsion of at least one hydrocarbon binder, and 438.5 parts of said at least one hydraulic binder.

14. The compound binder as claimed in claim 13, which contains 175.9 parts cold water, and wherein said aqueous emulsion contains 57% bitumen.

15. The compound binder as claimed in claim 1, which comprises, per 1000 parts of total compound binder, 362.3 parts of said aqueous emulsion of at least one hydrocarbon binder, and 434.8 parts of said at least one hydraulic binder.

16. The compound binder as claimed in claim 15, which contains 202.9 parts cold water, and wherein said aqueous emulsion contains 60% dispersed hydrocarbon phase.

17. The compound binder as claimed in claim 1, which comprises, per 1000 parts of total compound binder, 584.8 parts of said aqueous emulsion of at least one hydrocarbon binder, and 415.2 parts of said at least one hydraulic binder.

18. The compound binder as claimed in claim 17, wherein said aqueous emulsion contains 43% dispersed phase comprising thinned bitumen containing 4% lamp oil.

* * * * *